US011402735B2

(12) United States Patent
Guo et al.

(10) Patent No.: US 11,402,735 B2
(45) Date of Patent: Aug. 2, 2022

(54) PROJECTION SYSTEM FOR PROJECTION DISPLAY

(71) Applicant: APPOTRONICS CORPORATION LIMITED, Guangdong (CN)

(72) Inventors: Zuqiang Guo, Guangdong (CN); Peng Du, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 159 days.

(21) Appl. No.: 16/641,320

(22) PCT Filed: Dec. 6, 2017

(86) PCT No.: PCT/CN2017/114736
§ 371 (c)(1),
(2) Date: Sep. 28, 2020

(87) PCT Pub. No.: WO2019/037329
PCT Pub. Date: Feb. 28, 2019

(65) Prior Publication Data
US 2021/0011363 A1    Jan. 14, 2021

(30) Foreign Application Priority Data

Aug. 24, 2017    (CN) .......................... 201710735960.6

(51) Int. Cl.
*G03B 21/20*    (2006.01)
*G02B 26/00*    (2006.01)
(Continued)

(52) U.S. Cl.
CPC ......... *G03B 21/204* (2013.01); *G02B 26/008* (2013.01); *G02B 27/1026* (2013.01);
(Continued)

(58) Field of Classification Search
CPC .............. G02B 26/008; G02B 27/1026; G02B 27/144; G03B 21/204; G03B 21/008; G03B 21/2066; G03B 21/208; G03B 33/08
See application file for complete search history.

(56) References Cited

U.S. PATENT DOCUMENTS 5,875,008 A    2/1999    Takahara et al.
6,247,816 B1    6/2001    Cipolla et al.
(Continued)

FOREIGN PATENT DOCUMENTS

CA    2142345    12/1994
CN    1768528    5/2006
(Continued)

OTHER PUBLICATIONS

International Search Report for International Application PCT/CN2017/114736, dated May 21, 2018.
(Continued)

*Primary Examiner* — Magda Cruz
(74) *Attorney, Agent, or Firm* — Burris Law, PLLC

(57) ABSTRACT

A projection system, comprising: a light-emitting apparatus for providing first light and second light emitted in a time sequence; a light-splitting system for dividing the first light into first primary color light and second primary color light, and dividing the second light into two paths of third primary color light; a spatial light modulator, comprising a first region and a second region, wherein the primary color light emitted along a first optical path enters the first region, and the primary color light emitted along a second optical path enters the second region; and an image processing apparatus for dividing, corresponding to the first region and the second region, image signals to be output into two groups, and
(Continued)

changing the sequence of at least one of the groups so as to match the time sequence of primary color light received in a corresponding region.

17 Claims, 12 Drawing Sheets

(51) Int. Cl.
    *G02B 27/10*     (2006.01)
    *G02B 27/14*     (2006.01)
    *G03B 21/00*     (2006.01)

(52) U.S. Cl.
    CPC ......... *G02B 27/144* (2013.01); *G03B 21/008* (2013.01); *G03B 21/208* (2013.01); *G03B 21/2066* (2013.01)

(56) References Cited

U.S. PATENT DOCUMENTS

| | | | |
|---|---|---|---|
| 6,332,684 | B1 | 12/2001 | Shibatani et al. |
| 2001/0019396 | A1 | 9/2001 | Akihiro et al. |
| 2005/0259225 | A1* | 11/2005 | Greenberg ......... G02B 27/1026 353/31 |
| 2009/0009719 | A1 | 1/2009 | Ryf |
| 2009/0180081 | A1 | 7/2009 | Yanagisawa et al. |
| 2013/0222709 | A1 | 8/2013 | Schuck et al. |
| 2013/0242534 | A1 | 9/2013 | Pettitt et al. |
| 2014/0055751 | A1 | 2/2014 | Wang et al. |
| 2014/0226306 | A1 | 8/2014 | Khan et al. |
| 2015/0181180 | A1* | 6/2015 | Guthrie ................... H04N 9/74 345/84 |
| 2016/0119595 | A1* | 4/2016 | Lyubarsky ........... G02B 27/145 353/20 |
| 2017/0048502 | A1* | 2/2017 | Guo .................... G02B 26/0833 |
| 2017/0212416 | A1* | 7/2017 | Kurashige .............. G03B 21/00 |

FOREIGN PATENT DOCUMENTS

| | | |
|---|---|---|
| CN | 102483520 | 5/2012 |
| CN | 103792782 | 5/2014 |
| CN | 104613418 | 5/2015 |
| CN | 104641289 | 5/2015 |
| CN | 105022212 | 11/2015 |
| CN | 106154711 | 11/2016 |
| CN | 106154714 | 11/2016 |
| CN | 106371273 | 2/2017 |
| CN | 206321932 | 7/2017 |
| EP | 1345066 | 9/2003 |
| EP | 3128749 | 2/2017 |
| EP | 3173865 | 5/2017 |
| JP | H1010467 | 1/1998 |
| JP | H10253921 | 9/1998 |
| JP | 2001174910 | 6/2001 |
| JP | 2003287808 | 10/2003 |
| JP | 2006259346 | 9/2006 |
| JP | 2008090239 | 4/2008 |
| JP | 2012155261 | 8/2012 |
| JP | 2014002176 | 1/2014 |
| JP | 2016170436 | 9/2016 |
| WO | 2008156811 | 12/2008 |
| WO | 2009045477 | 4/2009 |

OTHER PUBLICATIONS

Office Action in Chinese counterpart Application No. 201710735960.6, dated May 9, 2020, and English translation of thereof.

* cited by examiner

PROJECTION SYSTEM FOR PROJECTION DISPLAY

CROSS-REFERENCE TO RELATED APPLICATIONS

This application is a continuation of International Application No. PCT/CN2017/114736, filed on Dec. 6, 2017, which claims priority to and the benefit of CN 201710735960.6, filed on Aug. 24, 2017. The disclosures of the above applications are incorporated herein by reference.

FIELD

The present disclosure relates to the field of projection display and, particularly, to a light source system and a projection system using the light source system.

BACKGROUND

The statements in this section merely provide background information related to the present disclosure and may not constitute prior art.

At present, a scheme of a light source form of blue light+yellow light (Y+B) is generally applied to a three-piece spatial light modulator (3SLM) system or a two-piece spatial light modulator (2SLM) system, but these systems have large structures, complicated manufacturing processes, and high prices. In a single spatial light modulator system, since the efficiency of red phosphor is much lower than the efficiency of red light intercepted from yellow fluorescent light, when applying the light source form of Y+B to the single spatial light modulator system, it is necessary to decompose the yellow light (Y) to obtain green light (G) & red light (R), and R is lost by reflection when G is obtained and G is lost by reflection when R is obtained, which causes a low efficiency.

In an existing single spatial light modulator projection system, taking digital light processing (DLP) technology as an example, as shown in FIG. 1, the single spatial light modulator projection system includes an excitation light source 101, a wavelength conversion device 102, a filter wheel 103, a light relay system 104, a light homogenizing device 105, and a digital micromirror device (DMD) chip 106, and a total internal reflection (TIR) prism 107.

The excitation light source 101 emits excitation light to excite the rotating wavelength conversion device 102 to generate excited illumination light that is in a time sequence, and the filter wheel 103 is synchronized with the wavelength conversion device 102 and filters the illumination light. The filtered illumination light is homogenized by the light homogenizing device 105 and totally reflected at the TIR prism 107 to irradiate the DMD chip 106. The DMD chip 106 receives image signals and modulates the illumination light to form image light. Then the image light is emitted to a projection lens (not shown) via the TIR prism 107.

Surface structures of the wavelength conversion device 102 and the filter wheel 103 are as shown in FIG. 2. The excitation light excites the wavelength conversion device 102 to generate sequence light of B+Y, which is then filtered by the filter wheel 103 to form sequence light of blue light+red light+green light (B+R+G). As shown in FIG. 3, an emission spectrum of Y covers spectral regions of R and G, so R light and G light can be intercepted from the Y spectrum. When the filter wheel 103 rotates to a G filter region, R light is lost by reflection, and when the filter wheel 103 rotates to an R filter region, G light will be lost by reflection, and it can be seen from FIG. 3 that luminous flux lost from G light occupies most of the Y light, about 80%. Therefore, in the current technology, the lost luminous flux is relatively high, and the light efficiency of the system is relatively low.

SUMMARY

This section provides a general summary of the disclosure and is not a comprehensive disclosure of its full scope or all of its features.

In view of the above, the present disclosure provides a projection system with a high light energy utilization efficiency.

The present disclosure provides a projection system, including:

a light-emitting device configured to provide first light and second light that are to be emitted in time sequences;

a light-splitting system comprising:

a light-splitting device configured to split the first light into first primary color light and second primary color light, split the second light into two paths of third primary color light, emit the first primary color light along a first optical path and the second primary color light along a second optical path in a first time sequence, emit the first primary color light along the second optical path and the second primary color light along the first optical path in a second time sequence, and emit the two paths of third primary color light respectively along the first optical path and the second optical path in a third time sequence;

a spatial light modulator comprising at least a first region and a second region, wherein the first primary color light, the second primary color light, and the third primary color light that are emitted along the first optical path according to the first time sequence, the second time sequence, and the third time sequence enter the first region and are modulated by the first region into image light to be emitted, and the second primary color light, the first primary color light, and the third primary color light that are emitted along the second optical path according to the first time sequence, the second time sequence, and the third time sequence enter the second region and are modulated by the second region into image light to be emitted; and an image processing device configured to divide image signals to be outputted to the spatial light modulator into two groups corresponding to the first region and the second region, and change a sequence of at least one of the two groups of image signals to match time sequences according to which a region corresponding to the at least one group of image signals receives the first primary color light, the second primary color light, and the third primary color light.

Advantages of the projection system provided by the embodiments of the present disclosure lie in that at least two light channels are provided, and a single spatial light modulator can modulate at least two beams of incident light at the same time. In this way, the reflected light can be recovered to avoid light loss occurring when the light-splitting device splits light, thereby improving the light energy utilization efficiency. Moreover, the projection system has a relatively small structure volume and a relatively low cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
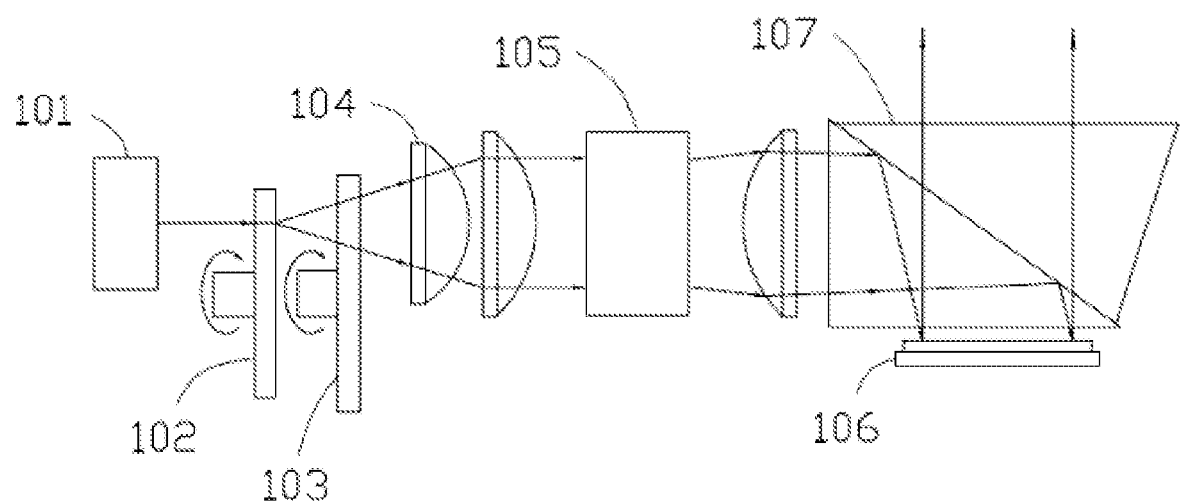
FIG. 1 is a structural schematic diagram of a single-piece spatial light modulator projection system in the related art.
Figure 2:
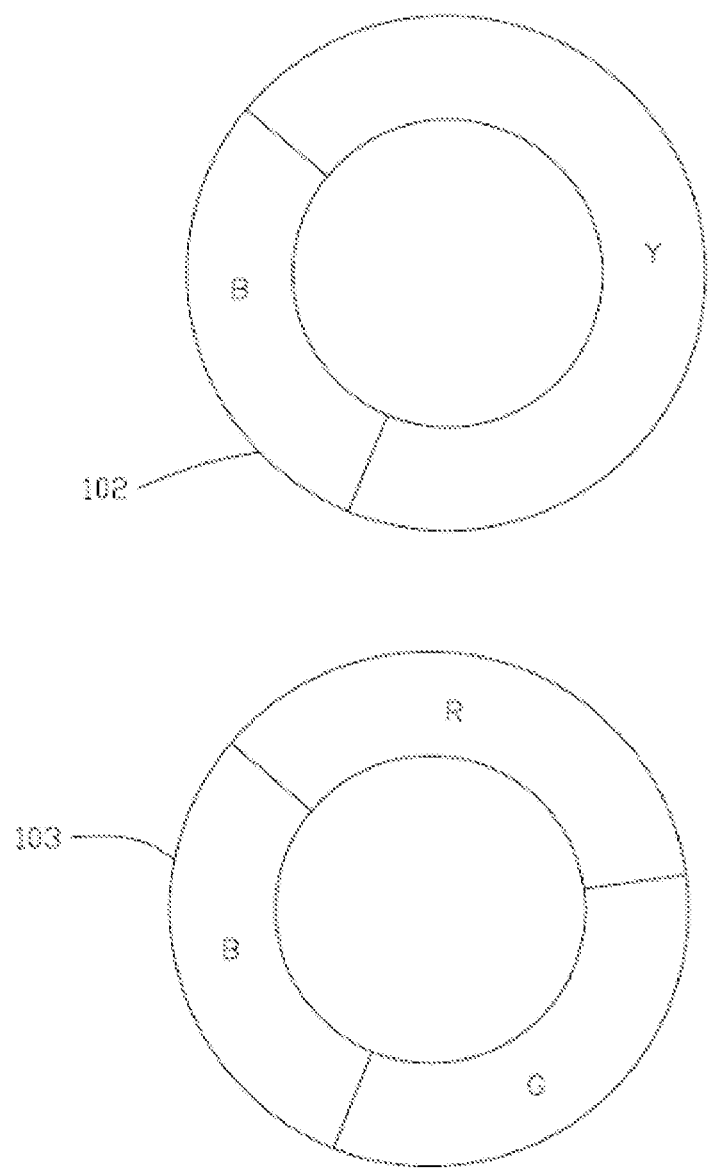
FIG. 2 is diagram of surface structures of a wavelength conversion device and a filter wheel of the single-piece spatial light modulator projection system shown in FIG. 1.
Figure 3:
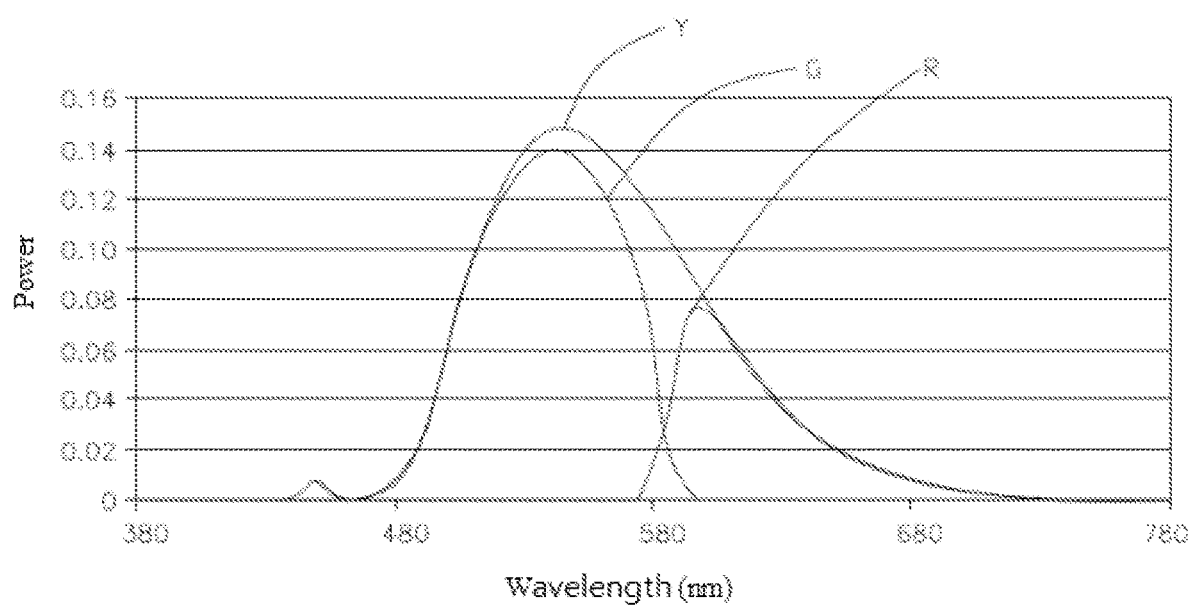
FIG. 3 is a diagram of spectra of Y, R, and G light.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The technical solutions in the embodiments of the present disclosure will be clearly and completely described with reference to the accompanying drawings in the embodiments of the present disclosure. Apparently, the described embodiments are only a part of the embodiments of the present disclosure but not all the embodiments. All other embodiments obtained by a person of ordinary skill in the art based on the embodiments of the present disclosure without creative efforts shall fall within the protection scope of the present disclosure.

Unless defined otherwise, all technical and scientific terms used herein have the same meaning as commonly understood by one of ordinary skill in the art to which the present disclosure belongs. The term "or/and" as used herein includes any and all combinations of one or more of the associated listed items.

Figure 4:
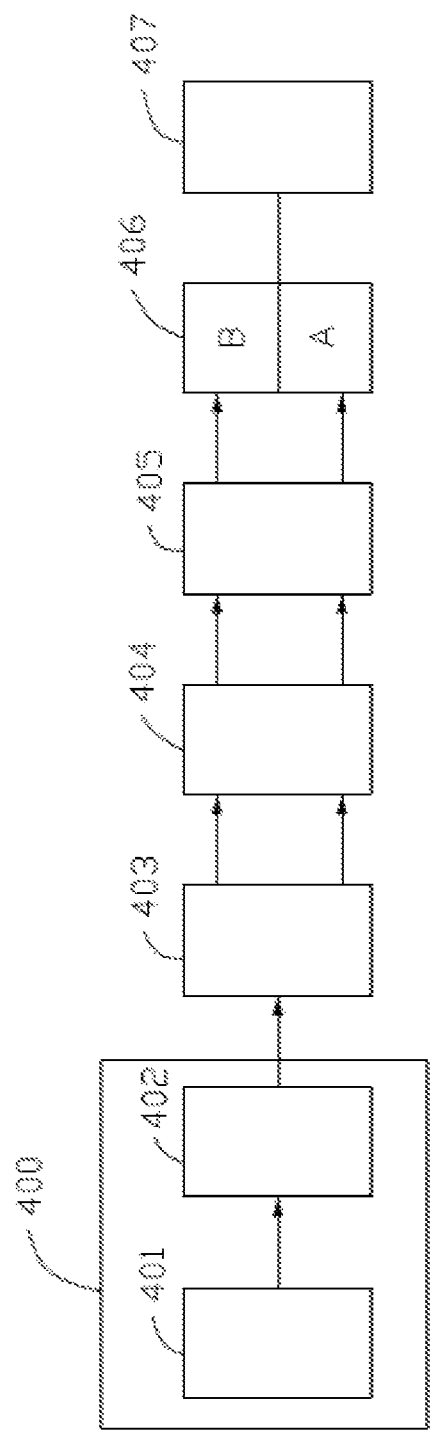
FIG. 4 is a schematic block diagram of a projection system in a first embodiment of the present disclosure.

Referring to FIG. 4, FIG. 4 is a schematic block diagram of a projection system according to an embodiment of the present disclosure. The projection system 40 includes a light-emitting device 400, a light-splitting system 403, a light homogenizing device 404, a light relay system 405, a spatial light modulator 406, and an image processing device 407. The light-emitting device 400 includes a light source 401 and a wavelength conversion device 402. The light source 401 is configured to provide excitation light, and the wavelength conversion device 402 is configured to receive the excitation light and provide first light and second light that are emitted in time sequences. The light-splitting system 403 is configured to respectively split the first light and the second light into at least two paths of primary color light and guide the primary color light to the light homogenizing device 404. The light homogenizing device 404 is configured to homogenize the primary color light. The light relay system 405 is configured to respectively guide the primary color light emitted from the light homogenizing device 404 to corresponding regions of the spatial light modulator 406. The spatial light modulator 406 includes two regions A and B, and each of the two regions A and B is configured to modulate the received primary color light according to image signals output by the image processing device 407, so as to obtain desired color image light. The spatial light modulator 406 can be a type of spatial light modulators such as LCD, LCOS, or DMD. The image processing device 407 is configured to divide the image signals into two groups corresponding to the two regions A and B of the spatial light modulator 406 before outputting the image signals to the spatial light modulator 406 and change the sequence of at least one of the two groups of image information according to time sequences of the primary color light irradiated on the corresponding region A or B. In the present embodiment, the image processing device 407 can be a software program and completes the above functions by being executed by a microcontroller unit, a processor, or the like. In other embodiments, the above functions of the image processing device 407 can be implemented by a suitable hardware circuit.

Figure 5:
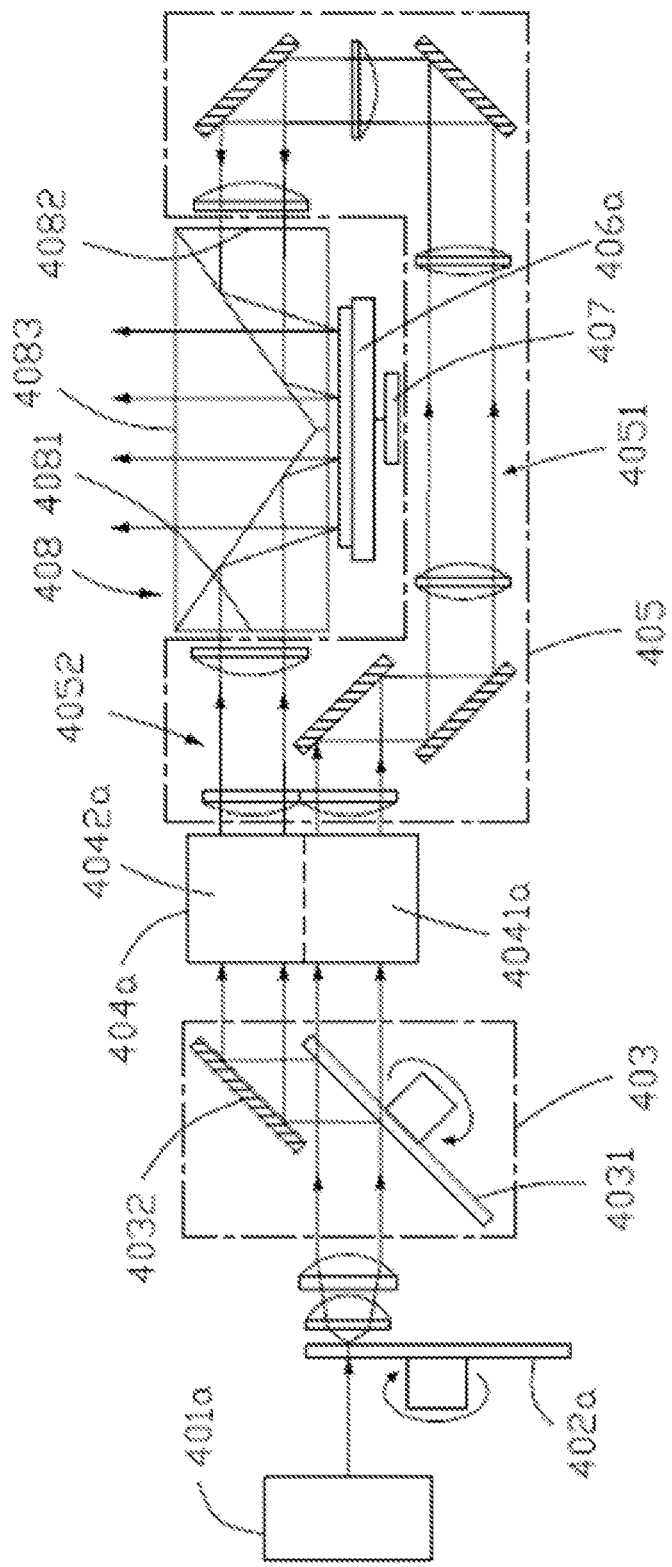
FIG. 5 is a specific implementation architecture diagram of the projection system shown in FIG. 4.

Referring to FIG. 5, FIG. 5 is a specific implementation architecture diagram of the projection system 40. In this specific embodiment, the light source 401 is a blue laser light source 401a, the wavelength conversion device 402 is a fluorescent color wheel 402a, the light-splitting system 403 includes a filter wheel 4031 and a reflective mirror 4032, the light homogenizing device 404 is a micro-lens array 404a, and the light modulator 406 is a DMD spatial light modulator 406a.

Figure 6:
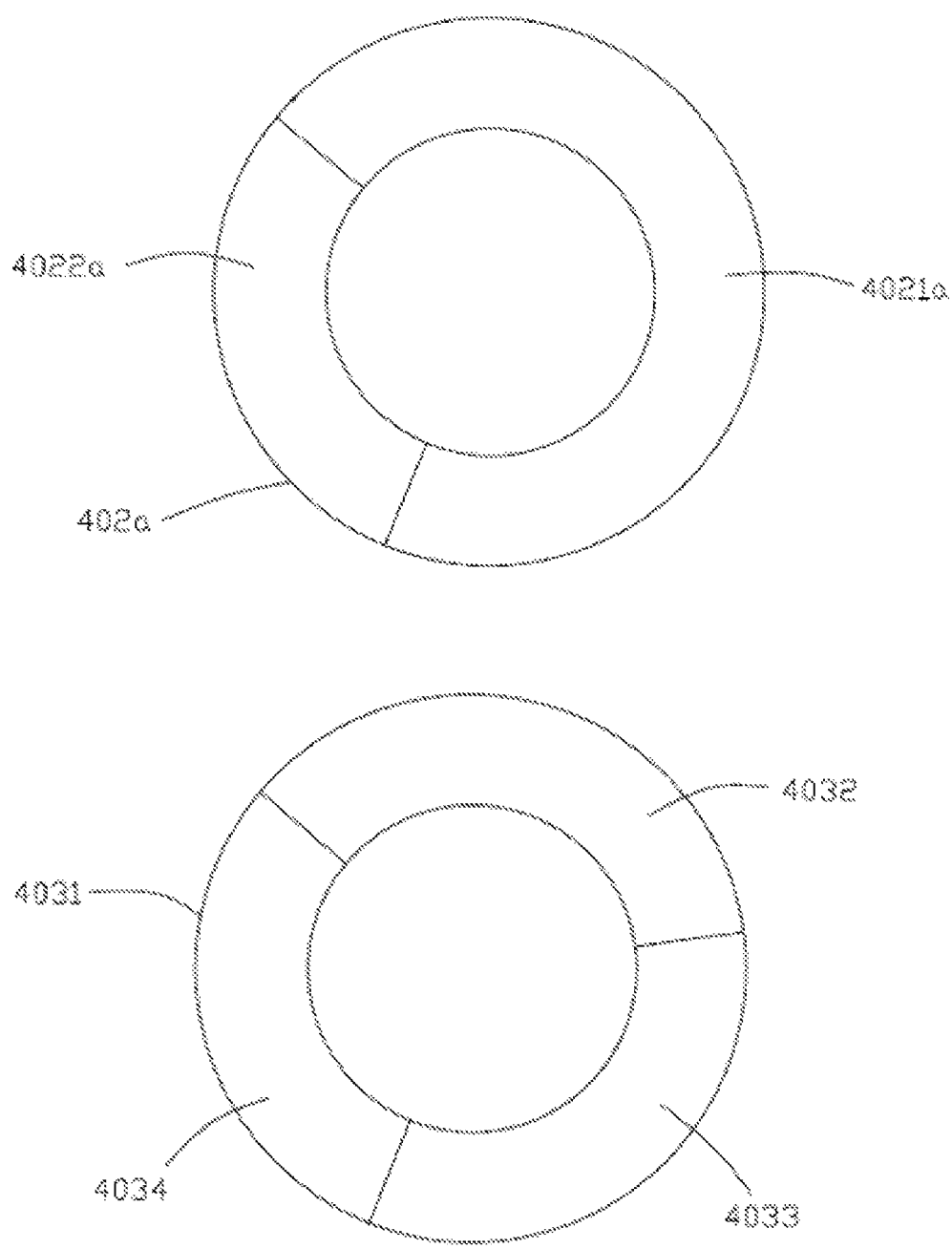
FIG. 6 is a schematic diagram of surface structures of a wavelength conversion device and a filter wheel of the projection system shown in FIG. 5.

Referring to FIG. 6 in conjunction, the fluorescent color wheel 402a is segmented into a first wavelength region 4021a and a second wavelength region 4022a along its circumferential direction. The first wavelength region 4021a is configured to generate the first light under excitation of the excitation light, and the second wavelength region 4022a is configured to generate the second light under excitation of the excitation light or to transmit the excitation light to form the second light. In this embodiment, the first wavelength region 4021a is provided with a wavelength conversion material such as a yellow phosphor, and the second wavelength region 4022a is a light transmitting region that can transmit blue laser light. The fluorescent color wheel 402a rotates periodically. When the excitation light is irradiated to the first wavelength region 4021a, the blue laser light is absorbed by the yellow phosphor and excites the yellow phosphor to generate yellow light, and the yellow light is the first light. When the excitation light is irradiated to the second wavelength region 4022a, the blue laser light is transmitted, and the blue light is the second light.

Without doubt, the light source 401 is not limited to the blue laser light but can also be laser light of other colors or other light sources such as a LED.

The filter wheel 4031 is configured to divide the first light into first primary color light and second primary color light, and to divide the second light into at least two paths of third primary color light. The filter wheel 4031 is segmented into a first primary color region 4032, a second primary color region 4033, and a third primary color region 4034 along its circumferential direction. The first primary color region 4032 is configured to divide the first light into first primary color light emitted along a first optical path and second primary color light emitted along a second optical path, and in this embodiment, the first primary color region 4032 transmits the first primary color light and reflects the second primary color light, and the first primary color light and the second primary color light are respectively emitted along the first optical path and the second optical path and finally emitted to the DMD spatial light modulator 406a. The second primary color region 4033 is configured to divide the first light into first primary color light emitted along the second optical path and second primary color light emitted along the first optical path, and in this embodiment, the second primary color region 4033 transmits the second primary color light and reflects the first primary color light, and the second primary color light and the first primary color light are respectively emitted along the first optical path and the second optical path and finally emitted to the DMD spatial light modulator 406a. The third primary color region 4034 is configured to divide the second light into two paths of third primary color light that are respectively emitted along the first optical path and the second optical path, and in this embodiment, the third primary color region 4034 transmits and reflects the two paths of third primary color light, and the two paths of third primary color light are respectively emitted along the first optical path and the second optical path and finally emitted to the DMD spatial light modulator 406a.

Figure 7:
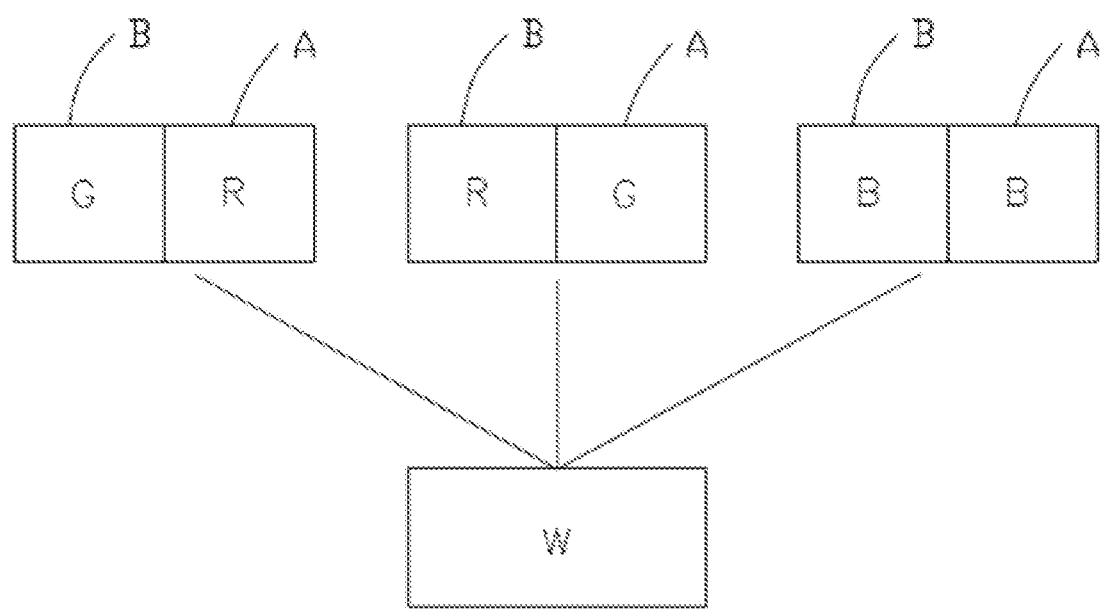
FIG. 7 is a schematic diagram of a time sequence of primary color light radiated to a spatial light modulator in the projection system shown in FIG. 5.

In this embodiment, the filter wheel 4031 rotates in synchronization with the fluorescent color wheel 402a. The first wavelength region 4021a of the fluorescent color wheel 402a corresponds to the first primary color region 4032 and the second primary color region 4033 of the filter wheel 4031, and the second wavelength region 4022a of the fluorescent color wheel 402a corresponds to the third primary color region 4034 of the filter wheel 4031. That is, when the first wavelength region 4021a of the fluorescent color wheel 402a is excited to generate yellow light, the yellow light is incident to the first primary color region 4032 of the filter wheel 4031, and the yellow light is divided into red light and green light. The red light is transmitted at the first primary color region 4032 and is sent along the first optical path to a first region A of the DMD spatial light modulator 406a, and the red light is the first primary color light. The green light is reflected at the first primary color region 4032 and is sent along the second optical path to a second region B of the DMD spatial light modulator 406a, and the green light is the second primary color light. When the filter wheel 4031 rotates to the second primary color region 4033, the green light is transmitted at the second primary color region 4033 and is sent along the first optical path to the first region A of the spatial light modulator 406a, and the red light is reflected at the second primary color region 4033 and is sent to the second region B of the spatial light modulator 406a along the second optical path. The third primary color region 4034 is provided with a color correction sheet, and the color correction sheet is a semi-reflective and semi-transmissive film or a polarizing film. When the second wavelength region 4022a of the fluorescent color wheel 402a transmits blue laser light, the filter wheel 4031 rotates to the third primary color region 4034, part of the blue light is transmitted and the other part thereof is reflected at the third primary color region 4034, the transmitted blue light is sent to the first region A of the DMD spatial light modulator 406a along the first optical path, the reflected blue light is sent to the second region B of the DMD spatial light modulator 406a along the second optical path, and the blue light is the third primary color light. In this embodiment, time sequences of the primary color light on the two regions A and B of the DMD spatial light modulator 406a are as shown in FIG. 7, in which a time sequence of the primary color light in the region A is R (red light) G (green light) B (blue light) . . . RGB, a time sequence of the primary color light in the region B is GRB . . . GRB, and white light W is formed by mixing in time domains of the regions A and B, respectively.

Therefore, on the one hand, due to a relatively high light conversion efficiency of the yellow phosphor, the yellow phosphor is excited by the blue laser light to generate yellow light, then the yellow light is divided into red light and green light, and the red light and green light are combined with the blue laser light, i.e., blue light, to form three primary color lights of red, green, and blue to be emitted to the DMD spatial light modulator 406a in a time sequence, without necessity of obtaining red light from red phosphor having a low light conversion efficiency, thereby improving a light energy utilization efficiency. On the other hand, the light reflected by the filter wheel 4031 can be recovered and emitted to the DMD spatial light modulator 406a, which avoids loss of light during light splitting, thereby improving the light energy utilization efficiency.

Without doubt, the first primary color light, the second primary color light, and the third primary color light are not limited to red light, green light, and blue light, respectively, and the present embodiment merely takes this case as an example for description. The first primary color light, the second primary color light, and the third primary color light can also be green light, red light, and blue light, respectively, or can be other combinations of red light, green light, and blue light. The first light and the second light are not limited to yellow light and blue light, as long as three primary color lights of red, green, and blue can be obtained by light splitting. Hereinafter, for description convenience, the case where the first light and the second light are yellow light and blue light are taken as an example, and the case where the first primary color light, the second primary color light, and the third primary color light are red light, green light, and blue light, respectively are also taken as an example.

In this specific embodiment, the microlens array 404a includes a first partial microlens array 4041a and a second partial microlens array 4042a. The light relay system 405 includes a first light relay system 4051 and a second light relay system 4052. The first partial microlens array 4041a and the first light relay system 4051 are disposed in the first optical path. The reflective mirror 4032, the second partial microlens array 4042a, and the second light relay system 4052 are disposed in the second optical path. The projection system 40 further includes a prism group 408 disposed above the DMD spatial light modulator 406a. The prism group 408 includes a first surface, i.e., a first side surface 4081, a second surface opposite to the first side surface 4081, i.e., a second side surface 4082, and a third surface 4083 provided between the first side surface 4081 and the second side surface 4082 and used for emitting image light to a projection lens (not shown). The primary color light coming through the first optical path enters the prism group 408 through the second side surface 4082 and is reflected by the prism group 408 to the region A of the DMD spatial light modulator 406a. The primary color light coming through the second optical path enters the prism group 408 through the first side surface 4081 and is reflected by the prism group 408 to the region B of the DMD spatial light modulator 406a. In this embodiment, the light relay system 405 is constituted by lenses, reflective mirrors, and the like with a certain arrangement.

According to the above embodiment, it can be seen that the time sequences of the primary color light irradiating on the two regions A and B of the spatial light modulator 406 will be different. For example, the time sequence of the primary color light on the region A is RGB . . . RGB, and the time sequence of the primary color light on the region B is GRB . . . GRB. Therefore, the time sequence of the primary color light on at least one region A or B will be different from a sequence of image signals to be outputted to the spatial light modulator 406. If the sequence of image signals to be outputted to the spatial light modulator 406 is RGB . . . RGB, then the sequence of image signal to be outputted to the region B needs to be modified to be consistent with the time sequence GRB . . . GRB of the primary color light on the region B.

Figure 8:
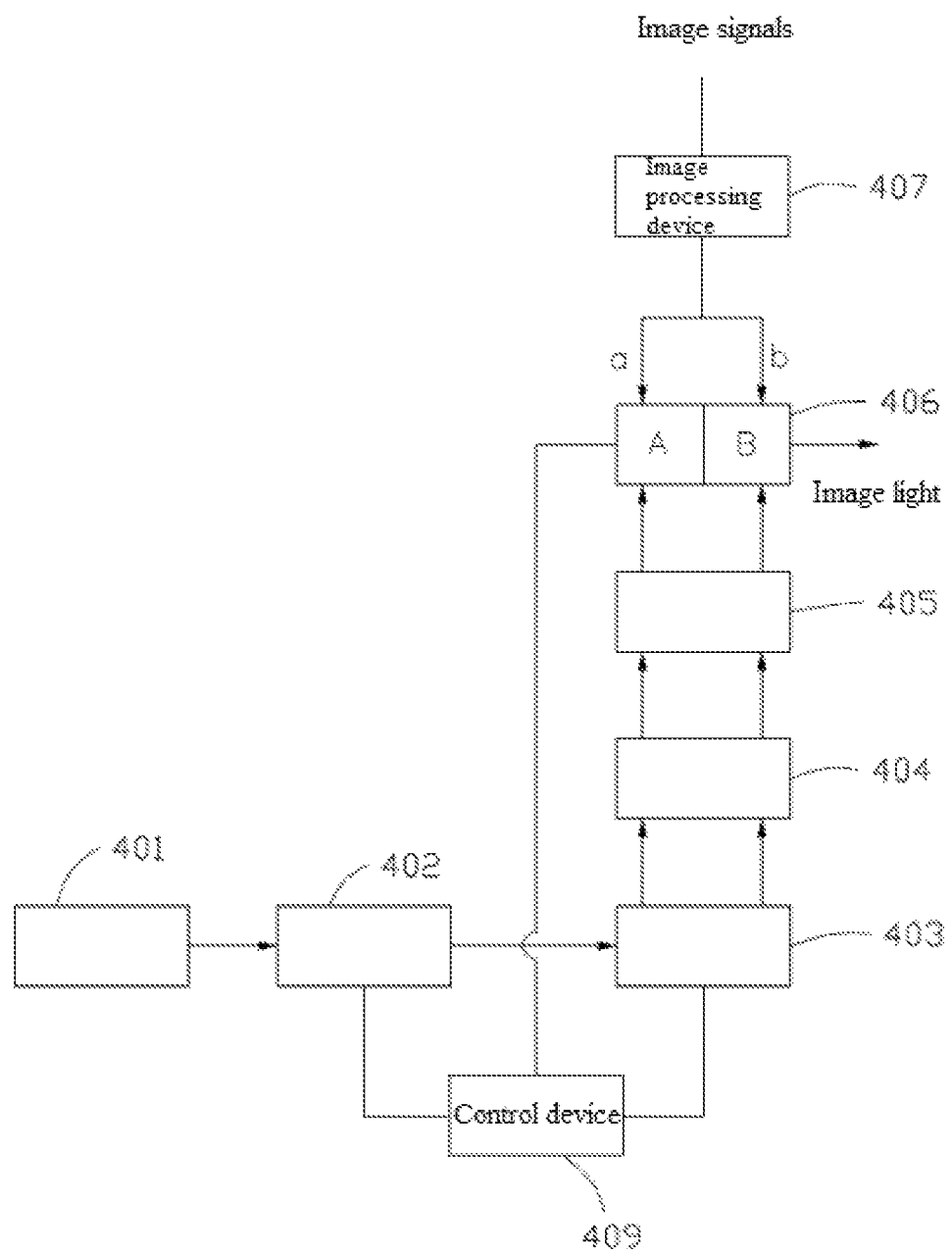
FIG. 8 is a schematic diagram of control of output of an image generated by the projection system shown in FIG. 5.
Figure 9:
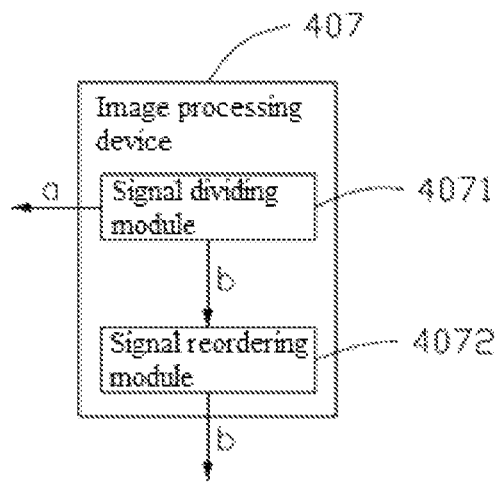
FIG. 9 is a schematic diagram of modules of an image signal processing device shown in FIG. 8.
Figure 10:
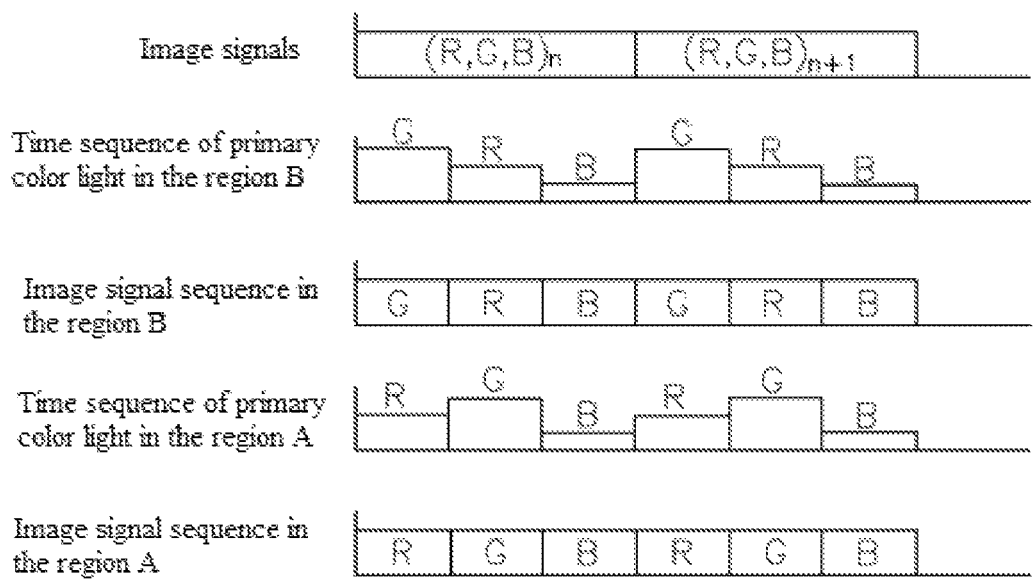
FIG. 10 is a schematic diagram of time sequences of primary color light of two regions of a spatial light modulator and image signal sequences in the projection system shown in FIG. 5.

Referring to FIG. 8 and FIG. 9, the image processing device 407 includes a signal dividing module 4071 and a signal reordering module 4072. The signal dividing module 407 divides the image signals into two groups a and b according to the segmentation of the regions A and B on the spatial light modulator 406. Signals of the group a correspond to the region A of the spatial light modulator 406, and signals of the group b correspond to the region B of the spatial light modulator 406. Still taking the case in which the image signal sequence is the same as the primary color light time sequence of the region A but is different from the primary color light time sequence of the region B as an example, the signals of the group a are outputted by the signal dividing module 4071 to the region A of the spatial light modulator 406, the signals of the group b is outputted by the signal dividing module 4071 to the signal reordering module 4072, and the signal reordering module 4072 transforms the sequence of the signals of the group b in order to match the primary color light time sequence of the region B and outputs the reordered signals of the group b to the region B of the spatial light modulator 406. Referring to FIG. 10 in conjunction, the time sequence of the primary color light on the region A is RGB . . . RGB, and the sequence of image signals outputted to the region A is also RGB . . . RGB and matches the time sequence of the primary color light of the region A, whereas the time sequence of the primary color light on the region B is GRB . . . GRB, and the sequence of image signals outputted to the region B is also transformed into GRB . . . GRB and matches the time sequence of the primary color light on the region B. The regions A and B of the spatial light modulator 406 respectively modulate the received primary color light according to the received image signals, so as to obtain desired color image light.

The projection system 40 further includes a control device 409, and the control device 409 controls the wavelength conversion device 402 to be synchronized with the filter wheel 403 and at the same time sends a feedback signal to the spatial light modulator 406 to synchronize the primary color light with the image signals in the spatial light modulator 406.

The embodiments described above have been applied to spatial light modulators such as LCOS and LCD, but for the spatial light modulator of the DMD type, since all micromirror units of the existing DMD spatial light modulator are set to be On when being rotated to an a direction and to be Off when being rotated to a b direction, the image light is projected to the projection lens (not shown) when the micromirror unit is in the On state, and the image light is kept away from the projection lens when the micromirror unit is in the Off state. Therefore, for the existing DMD spatial light modulator, when the directions of the primary color light incident to the regions A and B of the DMD spatial light modulator are different, for example: when the primary color light is respectively incident to the regions A and B of the DMD spatial light modulator from two opposite directions or other two different directions, signal values of the image signals to be outputted to at least one of the regions need to be corrected by matching an incidence angle of the primary color light, in order that both the two regions A and B of the DMD spatial light modulator output correct image light to form a correct color image.

Figure 11:
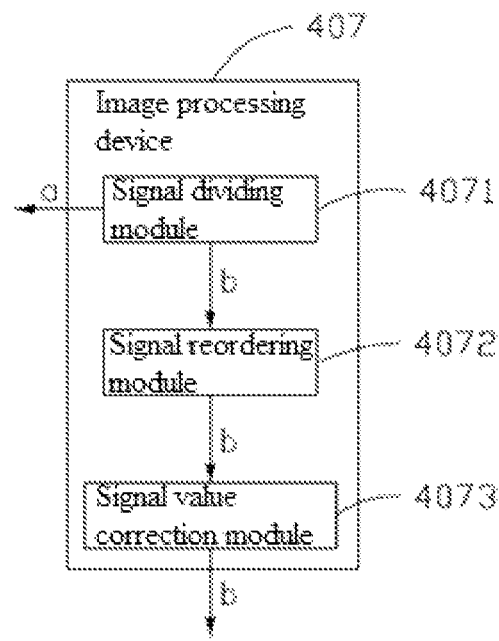
FIG. 11 is a schematic diagram of modules of another embodiment of the image processing device shown in FIG. 8.

In order to adapt to the existing DMD spatial light modulator, referring to FIG. 11, the image processing device 408 further includes a signal value correction module 4073. Still taking the case in which the signal values of the image signals to be output to the region B of the DMD spatial light modulator need to be corrected as an example, the signal value correction module 4073 corrects the signal value of the image signal to be outputted to the region B according to a change amplitude of an angle at which the primary color light is incident to the DMD spatial light modulator. For example, for the projection system 40 shown in FIG. 5, the angle at which the primary color light is incident on the region B is changed compared to an incidence angle in the related art, so that the micromirror unit keeps the image light away from the projection lens when the micromirror unit in the region B is rotated to the a direction while the micromirror unit transmits the image light to the projection lens when being rotated to the b direction. Therefore, the signal value correction module 4073 performs complementary correction on the signal values of the image signals to be output to the region B. For example, if a signal value of an original image is (G, R, B), then a signal value (G', R', B') to be output to the region B can be obtained through (G', R', B')=(255, 255, 255)−(G, R, B), so that the signal values of the image signals outputted to the region B match the incidence angle of the primary color light, thereby outputting the correct image light.

Figure 12:
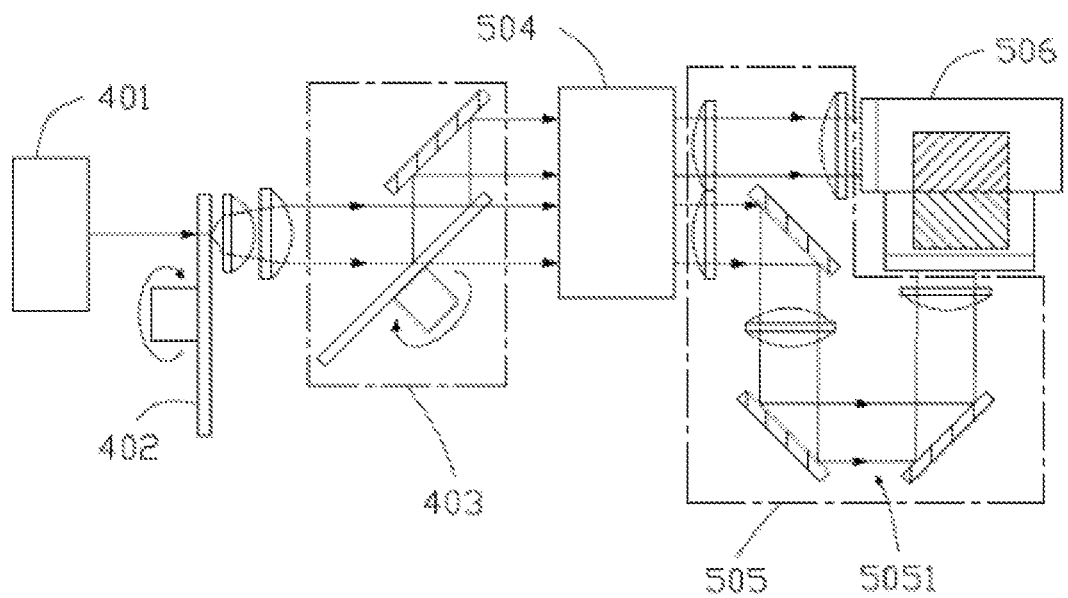
FIG. 12 is another specific implementation architecture diagram of the projection system shown in FIG. 4.
Figure 13:
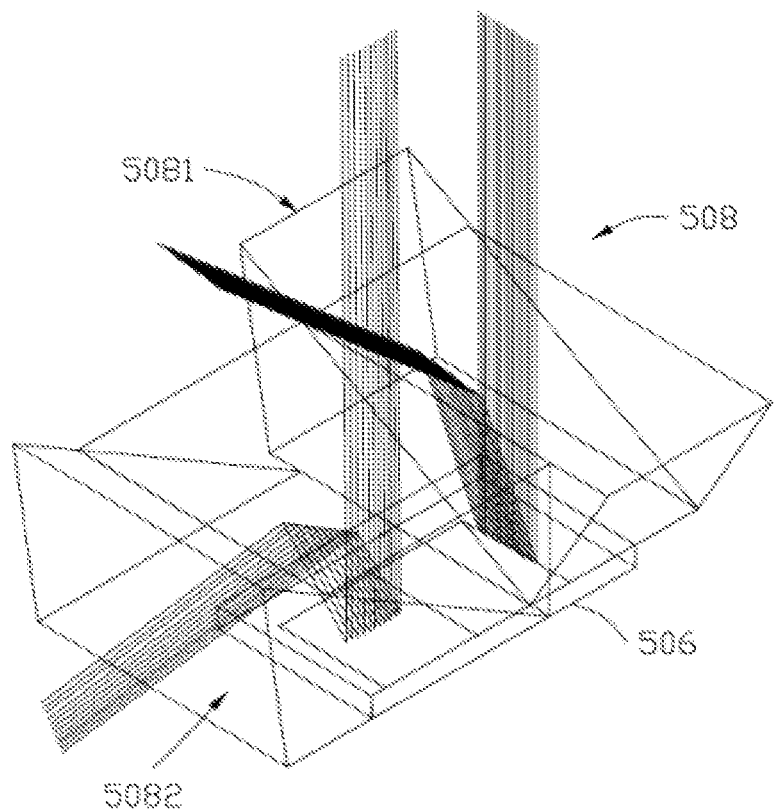
FIG. 13 is a schematic diagram of primary color light being incident to a spatial light modulator from two different angles in the projection system shown in FIG. 12.

Referring to FIG. 12, it is another specific implementation architecture diagram of the projection system 40 shown in FIG. 4. Referring to FIG. 13 in conjunction, a main difference of the present specific embodiment from the specific embodiment shown in FIG. 5 lies in that: the two paths of primary color light obtained after splitting of the light-splitting system 403 do not enter the prism group 508 respectively from the two opposite side surfaces of the prism group 508 to be reflected to the regions A and B of the spatial light modulator 506 but enter the prism group 508 from two adjacent side surfaces 5081 and 5082 of the prism group 508 to be reflected by the prism group 508 into the regions A and B of the spatial light modulator 506, respectively. Accordingly, the arrangement of the first light relay system 5051 of the light relay system 505 is slightly different from the arrangement of the first light relay system 4051, and compared with the specific embodiment shown in FIG. 5, this specific embodiment shortens an optical distance from the microlens array 504 to the spatial light modulator 506, which is beneficial to reducing a volume of the projection system 40.

Figure 14:
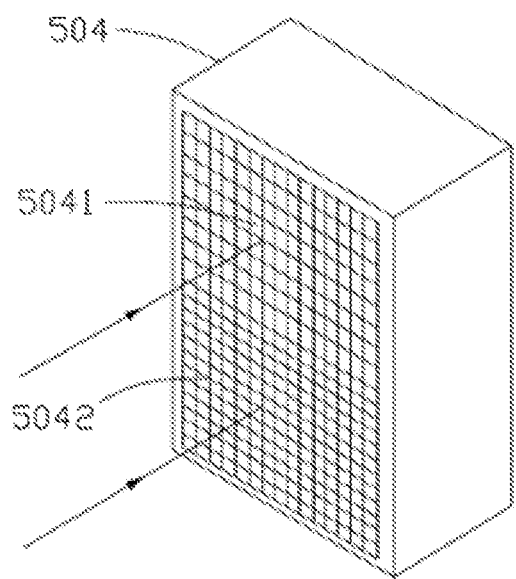
FIG. 14 is a schematic diagram of a microlens array of the projection system shown in FIG. 12.

In addition, since the two paths of primary color light respectively enter the prism group 508 from the two adjacent side surfaces 5081, 5082 of the prism group 508 and are reflected by the prism group 508 into the regions A and B of the spatial light modulator 506 respectively, sizes and aspect ratios of light spots projected to the regions A and B are different. To avoid this, the sizes and aspect ratios of the light spots projected to the regions A and B are set to be identical. Referring to FIG. 14, in this embodiment, a size of a microlens used in the first partial microlens array 5041 and a size of the microlenses used in the second partial microlens array 5042 are different, so as to modulate the sizes and aspect ratios of the light spots projected to the regions A and B to be identical. Without doubt, in other embodiments, the microlens array 504 can also be composed of two independent microlens arrays.

Figure 15:
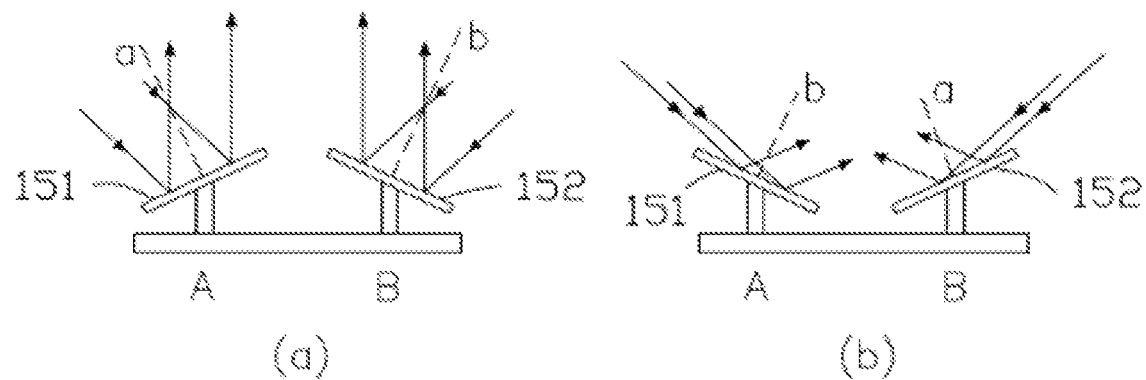
FIG. 15 is a schematic diagram showing a micromirror unit of a spatial light modulator of the projection system shown in FIG. 5 being in On and OFF states, where (a) is an "On" state, and (b) is an "Off" state.

Referring to FIG. 15, for the DMD spatial light modulator, in a case where the image processing device 408 does not include the signal value correction module 4073, it is also possible to change, by improving substrate electrodes of the regions A and B of the DMD spatial light modulator, from the existing DMD spatial light modulator in which all the micromirror units are set to be On when being rotated to the a direction and to be Off when being rotated to the b direction, into one in which the micromirror unit 151 in the region A is On when being rotated to the a direction and is Off when being rotated to the b direction, while the micromirror unit 152 in the region B is On when being rotated to the b direction and is Off when being rotated to the a direction. In other words, since the angle at which the primary color light is incident on the region B is greatly changed compared to the incidence angle in the related art, the On/Off state of the micromirror unit 152 in the region B is reversely set. For example, a power unit or a transmission device on the substrate electrode 153 that drives the micromirror unit 152 to rotate can be changed so as to reverse the On/Off state of the micromirror unit 152 in the region B.

It can be understood that since a magnitude of change of the angle at which the primary color light is incident to the region B is different compared with the incidence angle in the related art, the rotation direction and angle of the micromirror unit 152 in the region B can be changed accordingly to match the angle at which the primary color light is incident on the region B. Therefore, in general, the micromirror unit 151 in the region A is in the On state when being rotated to a first direction (such as the a direction exemplified above) and is in the Off state when being rotated to a second direction (such as the b direction exemplified above), the micromirror unit 152 in the region B is in the On state when being rotated to a third direction and is in the Off state when being rotated to a fourth direction, where the third direction is different from the first direction, and the fourth direction is different from the second direction. Therefore, this is different from the DMD light modulator in the related art, in order to match that the primary color light is incident to different regions of the DMD light modulator from different angles. In addition, in order to match the angles at which the primary color light is incident to the two regions of the DMD light modulator, the third direction can be the same as the second direction or be different from the second direction, and the fourth direction can be the same as the first direction or be different from the fourth direction.

Figure 16:
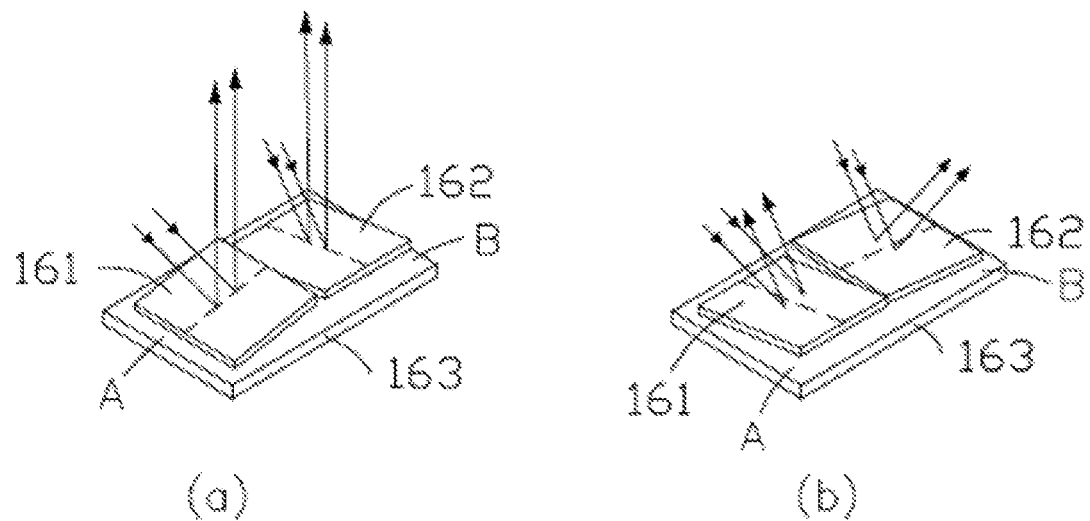
FIG. 16 is a schematic diagram showing a substrate electrode of a spatial light modulator of the projection system shown in FIG. 13 being in On and OFF states, where (a) is an "On" state, and (b) is an "Off" state.

Referring to FIG. 16, it is another example of improving the substrate electrodes of the regions A and B of the DMD spatial light modulator. In this embodiment, the substrate electrodes of the regions A and B drive the A and B to rotate in two dimensions, in which one dimension is to rotate about an axis parallel to the substrate electrode, and the other dimension is to rotate about an axis perpendicular to the substrate electrode 163. In this way, it allows the micromirror units 161 and 162 of the regions A and B to be switched between the two states On and Off, corresponding to the incidence angle of the primary color light.

It can be understood that the substrate electrode 163 can be configured to rotate in one dimension, two dimensions, or three dimensions as needed, to match the incidence angle of the primary color light and switch between the two states On and Off.

In conclusion, the projection system of the present disclosure is provided with at least two optical paths corresponding to different regions of a single spatial light modulator, and the single spatial light modulator can modulate at least two beams of incident light at the same time. In this way, the reflected light can be recovered to avoid light loss due to light splitting of the light-splitting device, thereby improving the light energy utilization efficiency. Moreover, the projection system only adopts a single spatial light modulator, so that the structure volume is relatively small, and the cost is relatively low.

The above embodiments are only used to illustrate the technical solutions of the present disclosure and are not limiting. Although the present disclosure has been described in detail with reference to the above preferred embodiments, those skilled in the art should understand that modifications or equivalent replacements can be made to the technical solutions of the present disclosure without departing from the spirit and scope of the technical solutions of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:
1. A projection system, comprising:
  a light-emitting device configured to provide first light and second light that are emitted in time sequences;

a light-splitting system comprising:
a light-splitting device configured to split the first light into first primary color light and second primary color light, split the second light into two paths of third primary color light, emit the first primary color light along a first optical path and the second primary color light along a second optical path in a first time sequence, emit the first primary color light along the second optical path and the second primary color light along the first optical path in a second time sequence, and emit the two paths of third primary color light respectively along the first optical path and the second optical path in a third time sequence;
a spatial light modulator comprising at least a first region and a second region, wherein the first primary color light, the second primary color light, and the third primary color light that are emitted along the first optical path according to the first time sequence, the second time sequence, and the third time sequence enter the first region and are modulated by the first region into image light to be emitted, and the second primary color light, the first primary color light, and the third primary color light that are emitted along the second optical path according to the first time sequence, the second time sequence, and the third time sequence enter the second region and are modulated by the second region into image light to be emitted; and
an image processing device configured to divide image signals to be outputted to the spatial light modulator into two groups of image signals corresponding to the first region and the second region, and change a sequence of at least one of the two groups of image signals to match time sequences according to which a region corresponding to the at least one group of image signals receives the first primary color light, the second primary color light, and the third primary color light.

2. The projection system according to claim 1, wherein the light-emitting device comprises:
an excitation light source configured to generate excitation light; and
a wavelength conversion device comprising a first wavelength region and a second wavelength region, the first wavelength region being configured to generate the first light under excitation of the excitation light, and the second wavelength region being configured to generate the second light under excitation of the excitation light or to transmit the excitation light to form the second light.

3. The projection system according to claim 2, wherein the excitation light source is blue laser light, the first wavelength region is provided with a yellow fluorescent material, and the second wavelength region is a light transmitting region.

4. The projection system according to claim 1, wherein the light-splitting device comprises a filter wheel comprising a first primary color region, a second primary color region, and a third primary color region that are distributed along a circumferential direction of the filter wheel, the first primary color region is configured to split the first light into at least the first primary color light to be emitted along the first optical path and the second primary color light to be emitted along the second optical path, the second primary color region is configured to split the first light into at least the second primary color light to be emitted along the first optical path and the first primary color light to be emitted along the second optical path, and the third primary color region is configured to split the second light into at least the two paths of third primary color light to be emitted along the first optical path and the second optical path.

5. The projection system according to claim 4, wherein the third primary color region is provided with a semi-reflective and semi-transmissive film or a polarizing film.

6. The projection system according to claim 1, further comprising a control device configured to control the light-emitting device and the light-splitting device to synchronize with the spatial light modulator, so that the first primary color light, the second primary color light, and the third primary color light synchronize with the image signals in the spatial light modulator.

7. The projection system according to claim 1, wherein the light modulator is a DMD light modulator, and the first primary color light, the second primary color light, and the third primary color light emitted from the first optical path and the second optical path are correspondingly incident to the first region and the second region of the DMD light modulator at different angles, respectively.

8. The projection system according to claim 7, wherein a prism group is disposed on the DMD light modulator, the first primary color light, the second primary color light, and the third primary color light emitted from the first optical path and the second optical path enter the prism group respectively through a first surface and a second surface of the prism group and are respectively guided to the first region and the second region of the DMD light modulator by the prism group, wherein the first surface is opposite to or adjacent to the second surface.

9. The projection system according to claim 7, wherein micromirror units of the first region and the second region of the DMD light modulator are in an On state when facing towards a first direction and are in an Off state when facing towards a second direction, and wherein the image processing device is further configured to correct, according to angles at which the first third primary color light, the second third primary color light, and the third primary color light are incident to the first region or the second region, a signal value of an image signal to be outputted to the region.

10. The projection system according to claim 7, wherein a micromirror unit on the first region of the DMD light modulator is in an On state when being rotated to a first direction and is in an Off state when being rotated to a second direction, and a micromirror unit on the second region is in an On state when being rotated to a third direction and is in an Off state when being rotated to a fourth direction, and wherein the third direction is different from the first direction, the second direction is different from the fourth direction, the second direction is the same as or different from the third direction, and the first direction is the same as or different from the fourth direction.

11. The projection system according to claim 10, wherein the micromirror unit on the first region of the DMD light modulator is configured to rotate in one dimension, two dimensions, or three dimensions, so as to rotate between the first direction and the second direction.

12. The projection system according to claim 7, wherein micromirror units of the first region and the second region of the DMD light modulator are in an On state when facing towards a first direction and are in an Off state when facing towards a second direction, and wherein the image processing device is further configured to perform complementary correction on the signal values of the image signals of the first region or the second region.

13. The projection system according to claim 10, wherein the micromirror unit on the second region of the DMD light modulator is configured to rotate in one dimension, two dimensions, or three dimensions, so as to rotate between the third direction and the fourth direction.

14. The projection system according to claim 1, wherein the light-splitting system comprises at least one reflective mirror, and the reflective mirror is configured to reflect the first primary color light, the second primary color light, and the third primary color light that are emitted from the light-splitting device into the first optical path and/or the second optical path.

15. The projection system according to claim 1, further comprising a light homogenizing device provided in the first optical path and the second optical path and configured to homogenize the first primary color light, the second primary color light, and the third primary color light passing therethrough.

16. The projection system according to claim 15, wherein the light homogenizing device is a microlens array, wherein the microlens array comprises a first partial microlens array disposed in the first optical path and a second partial microlens array disposed in the second optical path, and microlenses used in the first partial microlens array and the second partial microlens array are configured to modulate the first primary color light, the second primary color light, and the third primary color light projected onto the first region and the second region of the spatial light modulator to have identical sizes and aspect ratios of light spots.

17. The projection system according to claim 1, wherein the first light is yellow light, the second light is blue light, and the light-splitting device is configured to split, in time sequences, the yellow light into red light to be emitted along the first optical path and green light to be emitted along the second optical path, and into green light to be emitted along the first optical path and red light to be emitted along the second optical path, and the blue light into two paths of blue light to be emitted along the first optical path and the second optical path.

* * * * *